Nov. 29, 1949  C. V. LARRICK  2,489,908
CALIBRATOR FOR FIELD INTENSITY RECORDERS
Filed Oct. 29, 1946
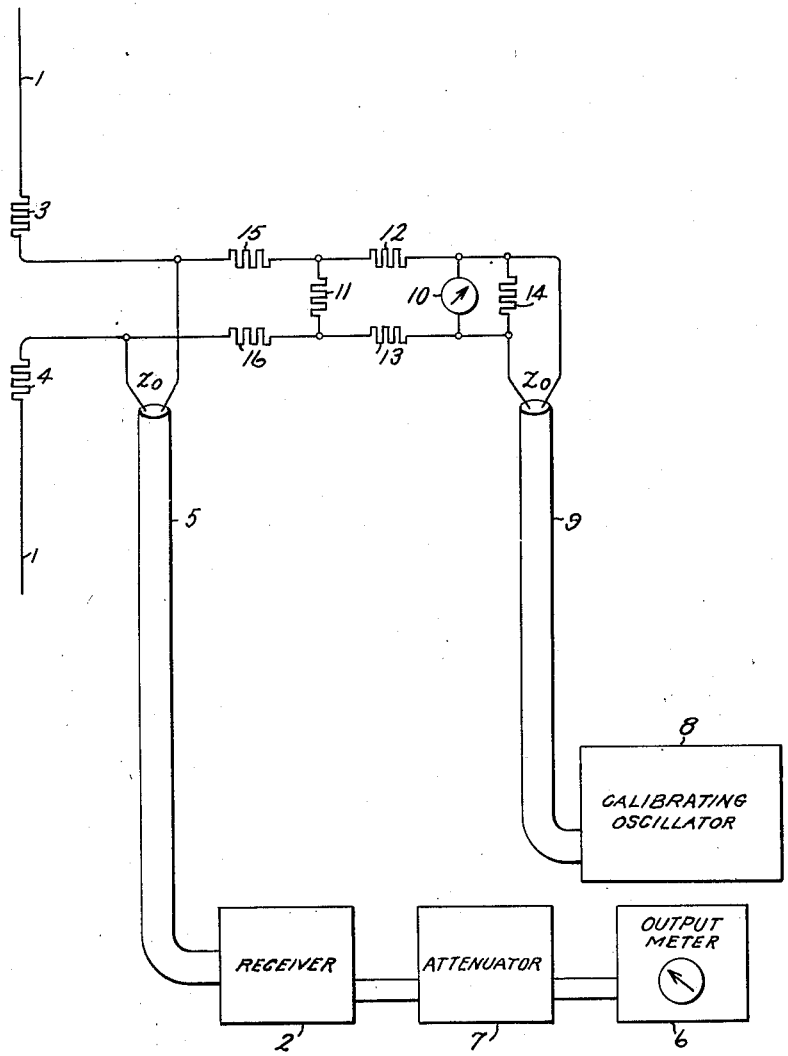
Inventor:
Charles V. Larrick,
by Prowell S. Mack
His Attorney.

Patented Nov. 29, 1949

2,489,908

UNITED STATES PATENT OFFICE 2,489,908

CALIBRATOR FOR FIELD INTENSITY RECORDERS

Charles V. Larrick, Richland, Wash., assignor to General Electric Company, a corporation of New York Application October 29, 1946, Serial No. 706,382

9 Claims. (Cl. 171—95)

My invention relates to calibrating circuits and more particularly to a new and improved calibrating circuit for a field intensity recorder.

The measurement of field intensities existing over the total area influenced by a high frequency transmitter necessitates the use of compact, portable instruments of high sensitivity. In obtaining good results, it is necessary to calibrate the setup in some fashion whereby the readings obtained may be interpreted properly and frequent calibration checks must be made to insure continued accuracy of results. It is desirable that this may be done quickly and easily under actual operating conditions when the apparatus is ready for use at the chosen location.

Devices measuring the field intensity caused by a radiating source, such as a transmitter with an associated antenna, employ receiving antenna which are usually designed for best operation on the frequency at which the energy is being radiated by the transmitter. An antenna is therefore an element in the circuit utilized in measuring the desired quantities. It is known that an antenna possesses an electrical characteristic usually referred to as radiation resistance which is measurable in ohms. Thus, a dipole antenna in free space has a radiation resistance of 75 ohms but this value may lie anywhere between 60 and 100 ohms because of proximity effects of the earth's surface or other absorbing objects such as buildings. Because of this change, the calibration of the circuit for one location of the antenna is affected and erroneous reading may result at other locations unless the circuit is designed to minimize the effect. For similar reasons, it is desirable to allow the arrangements and values of the other circuit elements to remain the same during calibration as during actual operation of the measuring device.

It is an object of my invention to provide a calibrating circuit for a field intensity recorder whereby accurate calibration may be accomplished quickly and easily.

It is another object of my invention to provide a new and improved field intensity measuring device whereby the effects of change in antenna radiation resistance are minimized.

It is a further object of my invention to provide a new and improved calibration circuit whereby calibration of the total measuring device including the circuit elements from the antenna to the receiver indicator is accomplished, thus eliminating the necessity for supplementary calculated correction factors.

It is still another object of my invention to provide a calibrating circuit which remains integral with the measuring device thereby eliminating the necessity for connecting and disconnecting or otherwise disturbing the circuit elements of the measuring device.

The features of the invention which are believed to be novel and patentable will be pointed out in the claims appended hereto. For a better understanding of the invention, reference is made in the following description to the accompanying drawing in which the single figure discloses a circuit embodying the principles of my invention.

Referring to the drawing, a dipole antenna 1 is shown connected to a receiver 2 through the series resistors 3 and 4 by means of a transmission line 5 whose characteristic impedance is designated by the symbol $Z_o$. An output meter 6 is connected across the output terminals of receiver 2 preferably through an attenuator 7. Thus a signal received by antenna 1 will be amplified by receiver 2 and its strength is measurable in terms of the output as indicated by meter 6.

Means are provided whereby the receiver and its associated elements may be calibrated so that the indication of meter 6 may be immediately converted into terms of field intensity at the antenna 1. These means include a source of high frequency energy such as a calibrating oscillator or R.-F. signal generator 8 whose output may be fed into the antenna circuit through a transmission line 9 which is preferably identical electrically with transmission line 5 and thus has a characteristic impedance also equal to $Z_o$. The output terminals of transmission line 9 are connected across a meter 10 and across a potential divider circuit consisting of the three resistances 11, 12, and 13 in series. A resistor 14 may also be connected, if desired, across the output terminals of transmission line 9 for purposes to be described. The voltage appearing across resistor 11 when the oscillator is in operation is made available to the receiver input terminals by connecting resistor 11 across the input terminals of transmission line 5 through resistors 15 and 16. The resistors 3, 15, 11, 16, and 4 in series constitute a potential divider circuit across antenna 1 one part of which, resistor 11, is also a part of the potential divider circuit consisting of resistors 12, 11, and 13 in series. Thus the voltages received by receiver 2 may originate either at antenna 1 or across resistor 11. Further, the voltage across resistor 11, measurable by meter 10, which causes the same deflection of output meter 6 as does some unknown voltage on antenna 1, in the absence of voltage across resistor 11, is a measure of the unknown voltage. Preferably, meter 10 is of the thermocouple type whereby its indicator may be placed near the output meter 6 which may be at some distance from the antenna and its circuit elements. Calibration is thereby facilitated since all meters are in the same general location.

While resistors are shown and described, and are preferable, it is evident that impedances containing resistance, inductance, or capacitance, singly or in combination, may also be utilized. If complex impedances are used it may be preferable that the phase or power factor angle of each impedance be the same thereby eliminating unequal variations therein with respect to frequency.

Although each of the various circuit elements may have various values, it is preferable that their values bear an essentially definite relationship with respect to each other. One such set of values may be derived in the following manner. It is apparent that the degree of coupling between the output of the calibrating oscillator 8 and the input to receiver 2 is principally controlled by the value of resistor 11 functioning as a portion of the voltage divider circuit consisting of resistors 12, 11, and 13 across the output of the oscillator 8. Since the usual oscillator output is high in comparison with normal required receiver input, resistor 11 is made small. If a value for resistor 11 is chosen the remaining values may be calculated as follows. Assume resistor 11 to be a 5 ohm resistance. The following values are already known.

R=radiation resistance of a dipole antenna in in free space=75 ohms
$Z_0$=surge impedance of the transmission line 5 or 9
$Z_0$=95 ohms for a chosen type It is general practice to match a receiver or oscillator to the transmission line employed. Thus the impedance looking into the transmission line towards the receiver or oscillator is equal to the surge impedance of the transmission line.

Let $V_1$=voltage induced on antenna 1
$V_5$=voltage resulting across the input terminals of transmission line 5
$V_{11}$=voltage across resistor 11 caused by oscillator output
$R_1$=antenna resistance plus resistance of resistors 3 and 4
$R_2$=resistance of resistors 11, 15, and 16 in series which is essentially equal to the resistance of resistors 15 and 16 only since resistor 11 is of small value in comparison with resistors 15 and 16 in series
$R_3$=resistance of resistors 12 and 13 in series It is desirable that the voltage $V_{11}$ caused by oscillation output have the same effect on receiver 2 as an equal value of induced voltage $V_1$ on antenna 1 when each appears separately.

For $V_1$ alone $$\frac{V_5}{V_1} = \frac{\frac{R_2 Z_0}{R_2 + Z_0}}{R_1 + \frac{R_2 Z_0}{R_2 + Z_0}} = \frac{R_2 Z_0}{R_1 R_2 + R_1 Z_0 + R_2 Z_0}$$

For $V_{11}$ alone $$\frac{V_5}{V_{11}} = \frac{\frac{R_1 Z_0}{R_1 + Z_0}}{R_2 + \frac{R_1 Z_0}{R_1 + Z_0}} = \frac{R_1 Z_0}{R_1 R_2 + R_1 Z_0 + R_2 Z_0}$$

from which $$\frac{V_1}{V_{11}} = \frac{R_1}{R_2}$$

But $$\frac{V_5}{V_1}$$

should equal $$\frac{V_5}{V_{11}}$$

It is apparent that they may be made equal by allowing $R_1$ to equal $R_2$ wherein the expressions simplify to $$\frac{V_5}{V_1} = \frac{V_5}{V_{11}} = \frac{Z_0}{2Z_0 + R_1}$$

But for maximum power transfer from the antenna to the receiver it can be shown that $$R_1 = 2Z_0$$

Thus $R_1$=190 ohms and resistors 3 and 4 are each equal to 57.5 ohms. Also $R_2$=190 ohms and resistors 15 and 16 are each equal to essentially 95 ohms.

An additional advantage in placing resistors 3 and 4 in series with antenna 1 becomes evident when considering the effect upon the circuit of an antenna radiation resistance other than that obtaining in free space. Thus if the radiation resistance is 60 ohms instead of 75 ohms as previously considered, although $$\frac{V_5}{V_1}$$

is no longer equal to $$\frac{V_5}{V_{11}}$$

their difference is only 8% as may be shown mathematically. Also, their difference is only 13% if the radiation resistance becomes 100 ohms instead of 75 ohms. It is evident this change would be much greater if resistors 3 and 4 were omitted. Conversely, this change may be decreased even more if resistors 3 and 4 are larger than the previously calculated values. Such increased values may be used if less than maximum power transfer from antenna to receiver can be tolerated.

It has been shown that $$\frac{V_1}{V_{11}} = \frac{R_1}{R_2}$$

This relationship exists between the calibrating voltage and the induced voltage of the antenna because $V_{11}$ is introduced into the antenna circuit instead of to the receiver directly. Thus no correction factors need be applied to the calibration if the input impedance of the transmission lines changes because of improper termination at the receiver end, since the ratio $$\frac{V_1}{V_{11}}$$

is independent of such change. This is a definite advantage since greater accuracy is thereby assured.

Resistors 12 and 13 have values chosen appropriately to allow meter 10 to register indications within the most accurate portion of its range. Thus, if a voltmeter with a range from zero to three volts and a resistance of 800 ohms is used when calibrating the receiver at 10,000 microvolts input to transmission line 5 resistance values of resistors 12 and 13, as calculated in the following manner, may be preferable.

If $V_5$ is to be 10,000 microvolts then $V_{11}$ must be .040 volt since $R_1$ and $R_2$ are each 2 times $Z_0$.

Resistor 11 and that portion of the circuit towards the antenna and receiver presents a resistance value of $$4.9 \text{ ohms} = \frac{5 \times 253.3}{258.3}$$

where $$253.3 = R_2 + \frac{R_1 Z_0}{R_1 + Z_0}$$

Then $$\frac{R_3 + 4.9}{4.9} = \frac{\text{meter voltage}}{V_{11}} = \frac{1.64 \text{ (chosen)}}{.04} = 41$$

or $R_3 = 196$ ohms and resistors 12 and 13 may each be 98 ohms in value.

It is evident that resistors 11, 12, 13, 15, and 16 constitute an H-network resistance attenuator having impedance elements selected in the manner hereinbefore set forth to give a desired value of attenuation and a desired impedance looking into its output terminals. Although other forms such as a T-network attenuator can be used, the H-network form is preferable in the circuit illustrated.

It is preferable to terminate the transmission line 9 in its surge impedance. This may be accomplished by utilizing resistor 14 of proper value. Thus $$\frac{1}{R_{14}} + \frac{1}{200.9} + \frac{1}{800} = \frac{1}{95}$$

from which $R_{14} = 233$ ohms as the value of resistor 14.

In calibrating the field intensity recorder it is only necessary to regulate the calibrating oscillator to the proper frequency and output voltage and record the readings of meter 10 and of the output meter 6 under conditions of essentially zero induced voltage on antenna 1. Since by design a definite determinable ratio between the reading of meter 10 and $V_5$ exists the output meter 6 may be calibrated in terms of $V_5$.

In operation as a recorder, the induced voltage on antenna 1 bears a definite and determinable relationship to $V_5$ and therefore to the reading of output meter 6 and may be measured in terms of the reading of output meter 6. The calibrating oscillator is inoperative but not disconnected from the recorder circuit while such readings are taken.

It may be preferable to utilize an antenna of such structure that dipoles of appropriate length may be used for each frequency at which measurements are taken. Substitution of a different set of dipoles does not affect the calibration of the equipment.

As will occur to those skilled in the art, various different arrangements and combinations of the principles described above may be employed without departing from the true spirit and scope of the invention and I therefore do not wish to limit my invention to the particular arrangement described.

What I claim as new and desire to secure by Letters Patent of the United States, is:

1. Electro-magnetic field intensity measuring apparatus comprising an antenna, a radio-frequency voltage measuring device, a first transmission line connected between said antenna and the input terminals of said measuring device, an attenuator having its output terminals connected to the antenna end of said transmission line, a radio-frequency signal generator, a second transmission line connected between the output terminals of said signal generator and the input terminals of said attenuator, and a meter connected to measure the amplitude of the input signal to said attenuator.

2. Apparatus as in claim 1 having at least one resistor connected in series with and adjacent to said antenna.

3. Electro-magnetic field intensity measuring apparatus comprising a dipole antenna, two impedance elements respectively connected in series with the two poles of said antenna, a radio receiver, a first transmission line connected between said two impedance elements and the input terminals of said receiver, indicating means responsive to the amplitude of the output signal of said receiver, an attenuator having its output terminals connected to the respective junctions of said two impedance elements and said first transmission line, a radio-frequency signal generator, a second transmission line connected between the output terminals of said signal generator and the input terminals of said attenuator, and a meter connected to measure the amplitude of the input signal to said attenuator.

4. Apparatus as in claim 3 in which the two impedance elements are equal resistors.

5. Apparatus as in claim 3 in which the impedance looking into the output terminals of the attenuator is substantially twice the characteristic impedance of the first transmission line.

6. Apparatus as in claim 3 in which the impedance looking into the output terminals of the attenuator is twice the characteristic impedance of the first transmission line and the impedance looking toward the antenna from the junctions of the two impedance elements and the first transmission line is substantially twice the characteristic impedance of the first transmission line.

7. Apparatus as in claim 3 having a resistor connected across the input terminals of the attenuator, said resistor having a value such that the second transmission line is terminated in its characteristic impedance.

8. Apparatus as in claim 3 in which the attenuator is an H-network resistance attenuator.

9. Electro-magnetic field intensity measuring apparatus comprising a dipole antenna, two equal resistors respectively connected in series with the two poles of said antenna, a radio receiver, a first transmission line connected between said two resistors and the input terminals of said receiver, said two resistors having such values that the impedance looking toward the antenna from the junctions of the two resistors and the first transmission line is substantially twice the characteristic impedance of said first transmission line, indicating means responsive to the amplitude of the output signal of said receiver, an H-network resistance attenuator having its output terminals connected to the respective junctions of said two resistors and said first transmission line, the impedance looking into the output terminals of the attenuator being twice the characteristic impedance of said first transmission line, a radio-frequency signal generator, a second transmission line connected between the output terminals of said signal generator and the input terminals of said attenuator, a radio-frequency voltmeter connected across the input terminals of said attenuator, and a third resistor connected across the input terminals of said attenuator, said third resistor having a resistance value such that said second transmission line is terminated in its characteristic impedance.

CHARLES V. LARRICK.

REFERENCES CITED

The following references are of record in the file of this patent:

UNITED STATES PATENTS

| Number | Name | Date |
|---|---|---|
| 1,781,363 | Bruce | Nov. 11, 1930 |
| 1,923,916 | Darboard | Aug. 22, 1933 |
| 2,295,629 | Bond | Sept. 15, 1942 |
| 2,323,076 | Paul | June 29, 1943 |
| 2,398,606 | Wang | Apr. 16, 1946 |
| 2,399,481 | George | Apr. 30, 1946 |
| 2,411,553 | Ramo | Nov. 26, 1946 |